United States Patent

[11] 3,632,961

[72] Inventors William E. Lent
 Los Angeles;
 Louis E. Gates, Jr., Inglewood, both of Calif.
[21] Appl. No. 86,961
[22] Filed Nov. 4, 1970
[45] Patented Jan. 4, 1972
[73] Assignee The United States of America as represented by the Secretary of the Navy
 Continuation-in-part of application Ser. No. 719,667, Apr. 8, 1968, now abandoned, which is a continuation-in-part of application Ser. No. 552,442, May 24, 1966. This application Nov. 4, 1970, Ser. No. 86,961

[54] SILICA-CLAY TOOLING MATERIAL FOR WELDING AND BRAZING OPERATIONS
 5 Claims, No Drawings
[52] U.S. Cl..................................................... 219/160,
 106/38.27, 106/38.9, 106/39 R, 106/45, 106/68, 228/50
[51] Int. Cl....................................................... B21j 13/08,
 B28b 7/28, C04b 35/14
[50] Field of Search............................................ 106/38.27,
 38.9, 39 R, 45, 67, 68; 228/50; 219/160; 72/481; 29/424; 117/6

[56] References Cited
UNITED STATES PATENTS

| | | | |
|---|---|---|---|
| 1,990,075 | 2/1935 | Horak.......................... | 106/6 F X |
| 2,159,349 | 5/1939 | Bennett....................... | 106/45 X |
| 3,846,324 | 8/1958 | Satterfield................... | 106/39 R |
| 3,202,554 | 8/1965 | Hornus......................... | 117/6 X |

OTHER REFERENCES

Dodd, A.; Dictionary of Ceramics; New York, 1964. p. 259. (TP788D6)

Kingery, W. D. Elements of Ceramics; Cambridge, 1952 p. 129. (TP807N65)

Ceramic Raw Materials, in Ceramic Industry Magazine, Chicago, 1967, p. 84. (TP785C411)

*Primary Examiner*—James E. Poer
*Assistant Examiner*—W. R. Satterfield
*Attorneys*—Richard S. Sciascia, Q. Baxter Warner and Howard J. Murray, Jr.

ABSTRACT: A heat-resistant salt-free ceramic material especially suitable for use as a tooling mandrel for assemblies to be welded or brazed where the temperature of the entire mandrel is not raised above approximately 600° F., and where the temperature adjacent to the mandrel is highly localized and of short duration. The invention material is thus especially suitable for electron beam welding, percussive arc welding, and induction brazing where heating is confined to a small portion of the article to be brazed. The material readily disintegrates or slakes when impinged with jets of hot water following the welding or brazing operation.

SILICA-CLAY TOOLING MATERIAL FOR WELDING AND BRAZING OPERATIONS

CROSS-REFERENCE TO RELATED APPLICATION

This application is a continuation-in-part of application Ser. No. 719,667 filed Apr. 8, 1968, now abandoned, which in turn was a continuation-in-part of Ser. No. 552,442 filed May 24, 1966, now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an easily removable heat-resistant ceramic material for use as a tooling mandrel employed in producing welded or brazed metal assemblies. The invention also relates to a method of fabricating such a mandrel.

At the present time, tooling mandrels for welded or brazed assemblies are formed from either metal or salt blocks. These expedients are not completely satisfactory, since metal mandrels can only be removed by physical withdrawal from a weldment, and cannot be removed at all if completely enclosed within the latter. On the other hand, salt block mandrels can be removed from an enclosure through small openings by dissolving the salt in water. However, the slow rate of solution and the high rate of chemical attack on metal inevitably result in severe corrosion of the assembly. This corrosion is especially serious and may be prohibitive for components manufactured of aluminum and magnesium alloys. Still further, salt pockets are produced during welding with salt block tooling, and such pockets can cause electrolytic corrosion at a later time. Such corroded surfaces, edges, and corners cannot be tolerated in many electrical applications, since they are highly detrimental to the performance of components intended for use at microwave frequencies.

It would be highly desirable to have available an easily removable heat-resistant material that can be employed as a precision tooling mandrel or fixture for welded or brazed metal assemblies where the temperature of the mandrel is not raised above approximately 600° F., and which material contains no reactive salt. If this material is slakeable or decomposable, then it can be removed very rapidly from the weldment by means of hot water injected through small openings in the assembly. With no corrosive constituent present in the material, no corrosive residue can remain, and the inner surface of the weldment requires no additional cleaning process or treatment. It is an objective of the present invention to provide such a material.

SUMMARY OF THE INVENTION

In accordance with a feature of the present concept, there is disclosed a slakeable or decomposable ceramic substance which consists of a unique combination of materials including inorganic refractory powders that constitute the bulk of the material, a water-soluble binder to provide satisfactory dry strength for machining and handling, and a process by means of which an object of desired shape may be fabricated by more-or-less standard ceramic-forming techniques. Such techniques may include casting, extrusion or dry pressing.

STATEMENT OF THE OBJECTS OF THE INVENTION

One object of the invention, therefore, is to provide an easily removable heat-resistant salt-free ceramic material designed for the purpose herein set forth, and which possesses high thermal shock resistance as well as being completely nonreactive with any byproducts of the welding operation.

Another object of the invention is to provide a process by means of which such a material is made.

Other and more particular objects will become apparent as the description of the invention proceeds in detail.

DESCRIPTION OF THE PREFERRED EMBODIMENT

The ceramic material of the present concept is obtained by blending together a number of ingredients including silica and mica powders and ball clay. Other ingredients include a borate, corn syrup and water. A complete listing of the constituents of a mixture representing a preferred embodiment of the present invention is as follows, the percentages of each being given by weight:

| Slakeable Ceramic Formula Limits | Weight (Percent) |
|---|---|
| Fused silica powder, 325 mesh | 10–50 |
| Mica powder, 325 mesh | 10–25 |
| Ball clay | 5–20 |
| Gerstley borate | 1–2.7 |
| Clear corn syrup | 1–4 |
| Sodium silicate or sodium polymethacrylate (as a deflocculant) | 0–0.6 |
| Sodium carbonate | 0–0.4 |
| Water | 5–40 |

An example of a specific formulation that has been used successfully in casting mandrels for welded assemblies is as follows:

| | Weight (Percent) |
|---|---|
| Fused silica powder, 325 mesh | 26.0 |
| Mica powder, 325 mesh | 14.5 |
| Ball clay | 16.9 |
| Gerstley borate | 2.64 |
| Clear corn syrup | 3.28 |
| Sodium silicate or sodium polymethacrylate | 0.53 |
| Sodium carbonate | 0.21 |
| Water | 35.94 |

A casting process by means of which the above-named constituents are combined to form the material of the present invention is as follows:

1. Blend the above-listed ingredients for approximately 20 minutes with a low-speed mixer in order to form a slip having the consistency of cream;
2. Ball mill this slip for approximately 1 hour in a 1-gallon porcelain ball mill with 6,000 grams of a suitable grinding media;
3. Strain the slip obtained by step No. 2 through an 80-mesh screen;
4. Cast the slip into the desired form (such as plates, discs, bars or rods) using conventional gypsum plaster molds;
5. Dry the molded articles thus obtained for about 24 hours at room temperature;
6. Cure the molded objects for an additional 24 hours at about 250° F. in an air-convection oven;
7. Dry-grind the cured objects to the specific configurations and tolerances required for the welding operation.

After the mandrel or fixture prepared in accordance with the above process has been employed in the welding operation, the material of which the mandrel or fixture is formed may readily be removed from the weldment by slaking with jets of hot water passed through small openings in the assembly. It has been found in practice that if this slaking operation is carefully performed, no trace of the ceramic material remains.

The ceramic material of the invention can also be fabricated by extrusion, in which case both the amount of water and the percentage of deflocculant are materially reduced, the latter approaching zero in some instances. A still further reduction in water content is achieved when the ceramic material is made by dry pressing.

A ceramic material prepared in any manner set forth above possesses a number of desirable properties, among which are the following:

1. The material possesses high thermal shock resistance—that is, no flaking or spalling occurs in the proximity of the weld area;
2. The material outgasses readily and does not interfere with normal pumpdown time of the vacuum chamber in an electron beam welder;
3. The material is nonreactive with any byproducts of the welding operation, since the small amount of sodium polymethacrylate or sodium silicate that is utilized produces no discernible corrosive effects;
4. The material has adequate strength and hardness to permit dry machining and to withstand normal handling;
5. The material is readily removed from aluminum and magnesium weldments by slaking with water after the stress-relieving and annealing cycles.

Since any portion of the described mandrel which is raised to a temperature exceeding 600° F. is hardened and thus rendered unslakeable or undecomposable, and since many welding and brazing operations involve temperatures higher than that mentioned, it is important to recognize that the invention mandrel is limited in its use to situations where any portion of the mandrel substance which is not too large in size to be flushed out when the mandrel is slaked with water. Small hardened pieces such as are formed during electron beam welding or percussive arc welding (for example) will readily flush out during the slaking process and do not detract from the invention operation in any way whatsoever. Obviously no limit can be set on the maximum allowable size of any mandrel portion so hardened, since it depends on the size of the opening in the welded object through which the hardened portion is to be flushed out.

EXAMPLE

As an example of the advantages obtained by the employment of a mandrel or fixture fabricated in accordance with the teaching of the present concept, four complete planar array antennas have been constructed, each array measuring 36 inches in diameter and about one-fourth inch thick. The metal web and planar surface thickness of the antenna array is 0.02 inch and the metal backup surface thereof is 0.05 inch in thickness. By constructing these antenna arrays using ceramic mandrels formulated in accordance with the herein-disclosed process, all of the antenna dimensions were held well within allowable tolerances, and the camber of the antenna was less than 0.005 inch. All of the antennas exceeded the required electrical characteristics under rigorous testing. Such planar antenna arrays are extremely difficult, if not impossible, to weld together unless ceramic mandrels as herein disclosed are employed in the construction process.

In the above example, the material of which the antenna arrays are composed is a magnesium alloy consisting of 3 percent aluminum, 1 percent zinc, and 96 percent magnesium. The operation was carried out by electron beam welding in which the actual welding temperature is about 1,400° F. in the immediate region of the weld only. In other words, this welding action was confined to a region approximately 0.010 inch wide on the surface of the antenna material. This operation did harden a very small "sliver" of the mandrel in the immediate region of the weld, but this "sliver" readily flushed out when the mandrel was subsequently subjected to jets of hot water.

The invention mandrel is thus highly useful in all cases where only a relatively small portion of the mandrel material directly receives the high heat of the weld and is thus rendered unslakeable. In many welding or brazing operations the weld is confined to a spot or thin line, and only a small area of the mandrel is in direct contact with the weld. Any amount of mandrel material hardened as a result will be small in size and will readily flush out when the mandrel is slaked.

The term "slakeable" as used herein is intended to be more or less synonymous with "decomposable" and "disintegratable and is in common usage by ceramicists. It refers to the well-known characteristic of certain clays to disintegrate in water to a slurry. See Norton, "Refractories," 3rd Edition 1949, McGraw-Hill Book Company, New York, pages 37-38.

It should be recognized that kiln washes, such as described in the prior art, are not "slakeable" in the sense set forth above. Slips and slurries are similarly not slakeable within the meaning of this term. Also, most "green" ceramic mixtures will not readily slake or disintegrate in water, especially if confined within the recesses of a weldment. If an ordinary "green" ceramic is heated to approximately 600° F. it will definitely not slake. Tests have conclusively demonstrated that such unfired mixtures are highly resistant to disintegration even when sluiced by a jet of hot water. Other tests where such unfired mixtures are dipped into a bath of water which is then vibrated at sonic frequency (60 Hz.) for extended periods of time show little disintegration.

Extensive experimentation during development of the material of the invention shows that the presence of between 1 percent and 2.7 percent of Gerstley borate and between 1 percent and 4 percent of corn syrup is essential to achieve the results set forth. Compositions not possessing these ingredients were unsatisfactory for the purpose.

Obviously many modifications and variations of the present invention are possible in the light of the above teachings. It is therefore to be understood that within the scope of the appended claims the invention may be practiced otherwise than as specifically described.

We claim:

1. A tooling mandrel composed of heat-resistant, salt-free, slakeable ceramic material, said mandrel being obtained by forming, drying and curing a slip formulated of the following ingredients in substantially the proportions set forth:

| | Weight (Percent) |
|---|---|
| Fused silica powder, 325 mesh | 26.0 |
| Mica powder, 325 mesh | 14.5 |
| Ball clay | 16.9 |
| Gerstley borate | 2.64 |
| Clear corn syrup | 3.28 |
| Deflocculant | 0.53 |
| Sodium carbonate | 0.21 |
| Water | 35.94 |

2. A tooling mandrel according to claim 1 in which the deflocculant is sodium polymethacrylate.

3. A tooling mandrel according to claim 1 in which the deflocculant is sodium silicate.

4. A tooling mandrel composed of heat-resistant, salt-free, slakeable ceramic material, said mandrel being obtained by forming, drying and curing a slip formulated of the following ingredients within the respective limits set forth:

| | Weight (Percent) |
|---|---|
| Fused silica powder, 325 mesh | 10-50 |
| Mica powder, 325 mesh | 10-25 |
| Ball clay | 5-20 |
| Gerstley borate | 1-2.7 |
| Clear corn syrup | 1-4 |
| A deflocculant selected from the group consisting of sodium polymethacrylate and sodium silicate | 0-0.6 |
| Sodium carbonate | 0-0.4 |
| Water | 5-40 |

5. The method of fabricating a tooling mandrel of ceramic material which is heat-resistant, slakeable, and salt-free, said method, including the steps of:

a. Blending together in a composition consisting essentially of the following ingredients for approximately 20 minutes in a low-speed mixer to form a slip:

| | Weight (Percent) |
|---|---|
| Fused silica powder, 325 mesh | 26.0 |
| Mica powder, 325 mesh | 14.5 |
| Ball clay | 16.9 |

| | |
|---|---|
| Gerstley borate | 2.64 |
| Clear corn syrup | 3.28 |
| A deflocculant selected from the group consisting of sodium polymethacrylate and sodium silicate | 0.53 |
| Sodium carbonate | 0.21 |
| Water | 35.94 | b. Ball milling the slip for approximately 1 hour in a porcelain ball mill with sufficient grinding media;

c. Straining the slip through an 80-mesh screen;
d. Casting the slip into the shape of the desired fixture;
e. Drying the casting approximately 24 hours at room temperature;
f. Curing the casting for approximately 24 hours at about 250° F.;
g. Dry-grinding the cured casting to the final fixture configuration and tolerance desired.

* * * * *